United States Patent
Dhillon et al.

(10) Patent No.: US 9,390,243 B2
(45) Date of Patent: Jul. 12, 2016

(54) DYNAMIC TRUST SCORE FOR EVALUATING ONGOING ONLINE RELATIONSHIPS

(75) Inventors: Mandeep Dhillon, San Jose, CA (US); Rajveer Tut, Mountain View, CA (US); Kerry Snyder, Redwood City, CA (US); Jasjot Sodhi, San Ramon, CA (US); Joshua Dzielak, San Francisco, CA (US); Amit Mahajan, Fremont, CA (US); Derek E. Baird, Mountain View, CA (US); Andrew K. Shin, San Francisco, CA (US)

(73) Assignee: Disney Enterprises, Inc., Burbank, CA (US)

( * ) Notice: Subject to any disclaimer, the term of this patent is extended or adjusted under 35 U.S.C. 154(b) by 89 days.

(21) Appl. No.: 13/407,643

(22) Filed: Feb. 28, 2012

(65) Prior Publication Data

US 2013/0227700 A1  Aug. 29, 2013

(51) Int. Cl.
```
G06F 7/04        (2006.01)
G06F 17/30       (2006.01)
H04N 7/16        (2011.01)
G06F 21/31       (2013.01)
G06Q 50/00       (2012.01)
H04L 29/06       (2006.01)
G06F 21/44       (2013.01)
G06Q 30/00       (2012.01)
G06Q 20/40       (2012.01)
```

(52) U.S. Cl.
CPC .............. *G06F 21/316* (2013.01); *G06Q 50/01* (2013.01); *H04L 63/105* (2013.01); *G06F 21/445* (2013.01); *G06F 2221/2111* (2013.01); *G06F 2221/2133* (2013.01); *G06Q 20/4097* (2013.01); *G06Q 30/01* (2013.01); *G06Q 30/018* (2013.01)

(58) Field of Classification Search
CPC ..... G06F 21/316; G06F 21/445; G06Q 50/01; G06Q 30/018; G06Q 20/4097; G06Q 30/01; G06Q 30/0224
USPC ........................................................ 726/26–30
See application file for complete search history.

(56) References Cited

U.S. PATENT DOCUMENTS

| | | | |
|---|---|---|---|
| 5,774,525 A * | 6/1998 | Kanevsky et al. ......... 379/88.02 |
| 6,115,709 A * | 9/2000 | Gilmour et al. ................. 706/50 |
| 6,496,936 B1 * | 12/2002 | French et al. ..................... 726/7 |
| 6,532,459 B1 * | 3/2003 | Berson | |
| 7,349,527 B2 * | 3/2008 | Yacoub et al. ............. 379/88.11 |
| 8,010,460 B2 * | 8/2011 | Work ..................... G06Q 10/00 705/319 |
| 8,234,688 B2 * | 7/2012 | Grandison et al. ................ 726/1 |
| 8,301,901 B2 * | 10/2012 | Buss ............................. 713/185 |
| 8,880,600 B2 * | 11/2014 | Lento et al. .................... 709/204 |
| 8,898,793 B2 * | 11/2014 | Miettinen ............... G06F 21/31 380/258 |
| 2003/0154393 A1 * | 8/2003 | Young ........................... 713/200 |

(Continued)

*Primary Examiner* — Jayesh Jhaveri
(74) *Attorney, Agent, or Firm* — Farjami & Farjami LLP (57) ABSTRACT

A method is provided for a dynamic trust score for evaluating ongoing online relationships. By considering a plurality of user data variables and using validation data from internal and external database sources, a trust score with a high degree of confidence may be provided for establishing and verifying online relationships. Since the trust score may be dynamically recalculated periodically or on demand, the trust score may also validate over continuing periods of time, as opposed to conventional verification systems that only validate at a single point in time. Thus, a higher degree of safety, reliability, and control is provided for online services directed towards children or other user classes that may require greater protection.

20 Claims, 3 Drawing Sheets

(56) References Cited

U.S. PATENT DOCUMENTS

| | | | |
|---|---|---|---|
| 2003/0172167 A1* | 9/2003 | Judge | H04L 12/585 709/229 |
| 2004/0064335 A1* | 4/2004 | Yang | G06Q 30/06 726/25 |
| 2005/0171955 A1* | 8/2005 | Hull | G06Q 50/01 |
| 2005/0204002 A1* | 9/2005 | Friend | 709/206 |
| 2006/0047725 A1* | 3/2006 | Bramson | G06F 21/604 |
| 2006/0059147 A1* | 3/2006 | Weiss et al. | 707/6 |
| 2006/0212931 A1* | 9/2006 | Shull et al. | 726/10 |
| 2006/0229896 A1* | 10/2006 | Rosen | G06Q 10/1053 705/321 |
| 2006/0259320 A1* | 11/2006 | LaSalle et al. | 705/1 |
| 2008/0084294 A1* | 4/2008 | Zhiying | G08B 21/12 340/539.22 |
| 2008/0301118 A1* | 12/2008 | Chien | G06F 17/30873 |
| 2009/0037355 A1* | 2/2009 | Brave | G06F 17/30867 706/45 |
| 2009/0064293 A1* | 3/2009 | Li et al. | 726/6 |
| 2009/0100504 A1* | 4/2009 | Conner et al. | 726/3 |
| 2009/0192853 A1* | 7/2009 | Drake et al. | 705/7 |
| 2009/0235334 A1* | 9/2009 | Park | H04L 63/102 726/4 |
| 2009/0248738 A1* | 10/2009 | Martinez et al. | 707/103 R |
| 2009/0276233 A1* | 11/2009 | Brimhall | G06Q 40/025 705/38 |
| 2010/0050233 A1* | 2/2010 | Ross | 726/2 |
| 2010/0229223 A1* | 9/2010 | Shepard et al. | 726/5 |
| 2010/0293094 A1* | 11/2010 | Kolkowitz | G06Q 20/40 705/44 |
| 2011/0016513 A1* | 1/2011 | Bailey, Jr. | G06F 21/552 726/5 |
| 2011/0035789 A1* | 2/2011 | Callahan et al. | 726/4 |
| 2011/0047608 A1* | 2/2011 | Levenberg | 726/7 |
| 2011/0113098 A1* | 5/2011 | Walsh | G06Q 10/00 709/204 |
| 2011/0258073 A1* | 10/2011 | Lifson | 705/26.7 |
| 2012/0036550 A1* | 2/2012 | Rodriguez et al. | 726/1 |
| 2012/0054845 A1* | 3/2012 | Rodriguez et al. | 726/7 |
| 2012/0079592 A1* | 3/2012 | Pandrangi | 726/22 |
| 2012/0144468 A1* | 6/2012 | Pratt et al. | 726/7 |
| 2012/0191594 A1* | 7/2012 | Welch et al. | 705/38 |
| 2012/0290427 A1* | 11/2012 | Reed | G06Q 50/01 705/26.2 |

* cited by examiner

DYNAMIC TRUST SCORE FOR EVALUATING ONGOING ONLINE RELATIONSHIPS

BACKGROUND

The World Wide Web is more aptly named than ever, with Internet access becoming increasingly integral to business, education, science, and many other pursuits. In particular, children are especially dependent on these technologies, and their future careers will likely be determined by their competence in interacting with and employing Internet based technologies.

However, with large networks of digital citizens and various Internet communication platforms, it is often difficult to verify the identity of users to any degree of certainty. The Internet is still very much analogous to the Wild West of old: misrepresentation with aliases and handles abounds, impersonation and identity theft are all too common, and citizens may hide behind the anonymity of the Internet to engage in behavior which they would altogether avoid if they were responsible or accountable for their actions. Consequently, many parents are apprehensive of allowing their children to roam freely online, depriving them of unparalleled educational opportunities and valuable experience with Internet technology.

Moreover, other parties besides parents also have an interest in verifying the identity of users. For example, employers may seek to verify the background and identity of potential employees during the screening and hiring process. Parties to commercial and financial transactions may seek to verify the authenticity of the other party in order to mitigate the risk of doing business with pseudonymous and anonymous parties.

Conventionally, such verification may be carried out using security measures such as CAPTCHA and two-step verification. However, such security measures often inconvenience the user and introduce an undesirable amount of complexity, which may be particularly problematic for children and other users.

SUMMARY

The present disclosure is directed to a dynamic trust score for evaluating ongoing online relationships, substantially as shown in and/or described in connection with at least one of the figures, as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The implementations described herein seek to enable children and their parents to embrace today's Internet technology with certainty and safety, in order to foster their development as responsible, digital citizens. In addition to providing stronger parental controls, the disclosed implementations are also applicable to verify any other relationships, such as for employment or financial transactions. By monitoring the identities of users and the integrity of their relationships with each other, a measurable sense of security to Internet users and service providers alike is provided. The culture that will result in online networks from widespread adoption of such implementations will thus be founded upon verifiable interpersonal relationships, much like the real world networks we value and trust.

Figure 1:
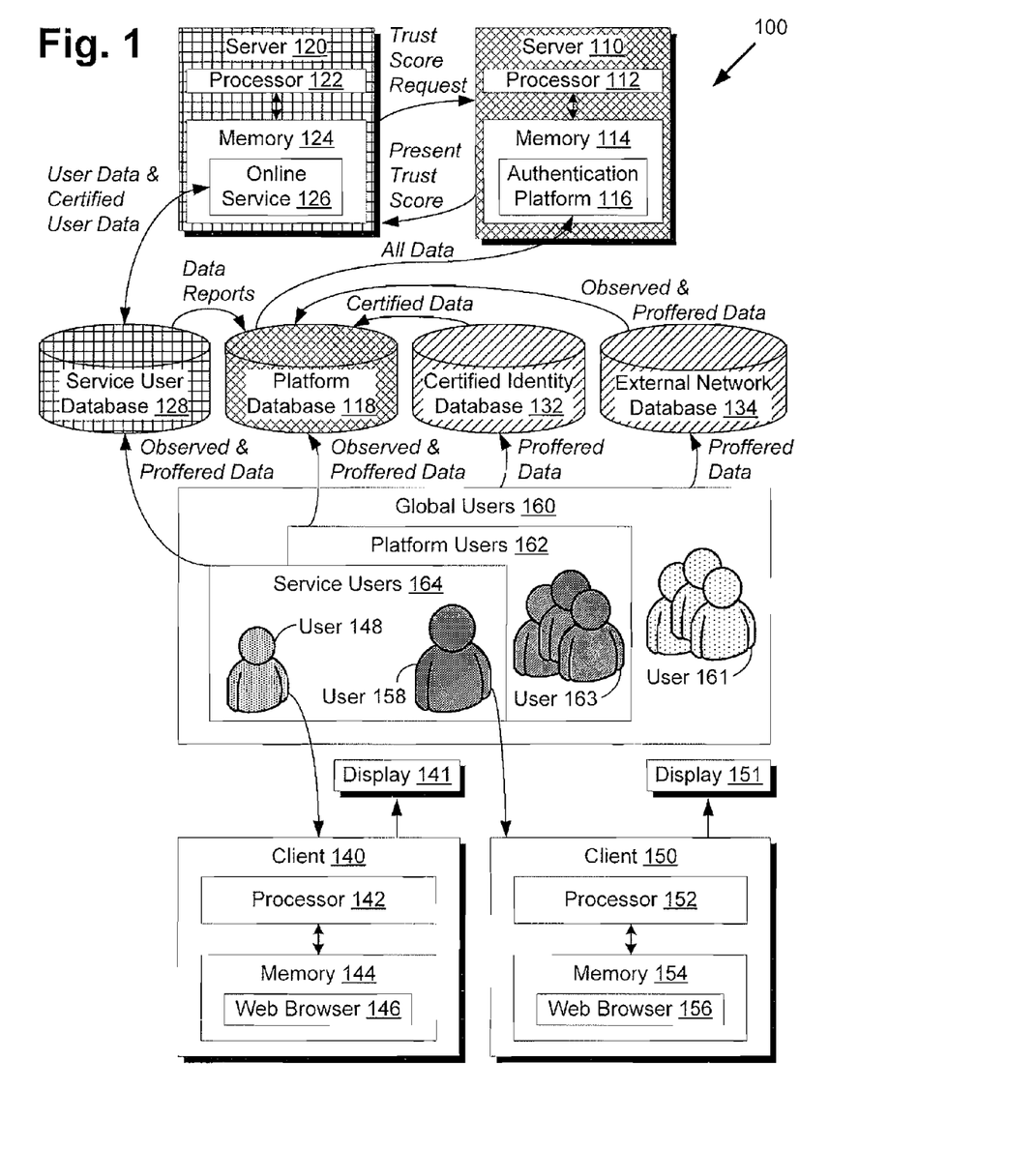
FIG. 1 presents an exemplary diagram of a system for providing a dynamic trust score for evaluating ongoing online relationships.

FIG. 1 presents an exemplary diagram of a system for providing a dynamic trust score for evaluating ongoing online relationships. Diagram 100 of FIG. 1 includes server 110, server 120, platform database 118, service user database 128, certified identity database 132, external network database 134, client 140, display 141, client 150, display 151, and global users 160. Server 110 includes processor 112 and memory 114. Memory 114 includes authentication platform 116. Server 120 includes processor 122 and memory 124. Memory 124 includes online service 126. Client 140 includes processor 142 and memory 144. Memory 144 includes web browser 146. Client 150 includes processor 152 and memory 154. Memory 154 includes web browser 156. Global users 160 include user 162 and platform users 162. Platform users 162 include user 163 and service users 164. Service users 164 include user 148 and user 158.

While not specifically shown in diagram 100, it is understood that a network may support data communications between the elements of diagram 100 including clients, servers, and databases. The network may include the public Internet and private intranets, and may include both wired and wireless components. Furthermore, network communications may be transmitted through secure channels as necessary, for example through Hypertext Transfer Protocol Secure (HTTPS).

In diagram 100, an authentication platform 116 is provided that accepts trust score requests concerning a particular user, calculates a present trust score using all data concerning that user from various resources consolidated into platform database 118, and responds to the request by providing the present trust score. Besides providing trust scores, authentication platform 116 may also provide shared logins for granting access to several services and applications with a single set of credentials, such as a username and password. While only one online service 126 is shown in diagram 100 for simplicity, multiple online services or applications may utilize authentication platform 116.

As shown in diagram 100, users are divided into three conceptual categories depending on usage of authentication platform 116 and online service 126. Global users 160 may encompass all possible users, including users that do not utilize authentication platform 116 or online service 126. Thus, user 161 may lack user accounts with both authentication platform 116 and online service 126. However, user 161 may have user accounts with other online services, for example external social networking sites, gaming networks, education networks, and other services. Platform users 162 include all users that utilize authentication platform 116, but not necessarily online service 126. Thus, user 163 may have a user account with authentication platform 116, but may lack a user account with online service 126. Service users 164 include all users that utilize online service 126, but not necessarily authentication platform 116. Thus, user 148 may only have a user account with online service 126, whereas user 158 may have a user account with both online service 126 and authentication platform 116. Accordingly, user 158 may be considered to be a member of platform users 162, whereas user 148 is not a member of platform users 162. Of course, all users are considered part of global users 160 including user 148, user 158, user 163, and user 161.

Diagram 100 illustrates an exemplary scenario where a trust score is desirable to establish and verify a relationship between users. For example, user 148 may be a minor child. User 148 may utilize web browser 146 executing on processor 142 of client 140 to access online service 126, which may provide an online game targeted towards a younger audience. Service user database 128 may be a first party database with data concerning users of online service 126. Platform database 118 may include data concerning users of online service 126 and users of other services that may utilize authentication platform 116. External network database 134 may also contain data concerning the same users of user database 132, but may be under the control of a third party, for example an outside social networking site. Online service 126 may utilize authentication platform 116 to retrieve trust scores for determining the validity of relationships between certain users and also to continuously authenticate users.

To comply with regulatory schemes such as the Children's Online Privacy Protection Act (COPPA), cultural norms, and community standards of ethics, online service 126 may first require verifiable consent from a parent or guardian, or user 158, before allowing user 148 to participate in online service 126. As a preliminary matter, a parent-child relationship between user 158 and user 148 must therefore be established. Conventionally, user 158 may utilize web browser 156 executing on processor 152 of client 150 to provide such verifiable consent to online service 126 through a one-time procedure such as credit card verification, telephone verification, consent form signing, e-mails with digital signing, and other procedures. Such conventional procedures may meet the bare minimum requirements to satisfy regulatory requirements. However, to provide a safe and trusted environment, online service 126 should provide a stronger assurance of verified consent by providing relationship and user authentication with a high degree of confidence and ongoing validity over time.

Accordingly, online service 126 may utilize authentication platform 116 executing on processor 112 of server 110 to request a dynamic trust score for evaluating an ongoing online relationship between user 148 and user 158. Authentication platform 116 may dynamically calculate a trust score for evaluating the validity of the parent-child relationship between user 148 and 158, using all data available from platform database 118.

As shown in diagram 100, platform database 118 may consolidate user data from a variety of internal and external sources, as described in greater detail with FIG. 2 below. Starting with service users 164, both users 148 and 158 may proffer data, or provide data directly in response to data collection requests and queries. Such proffered data may be stored in service user database 128 and may include user-to-user communications and answers to direct question inquiries such as verification e-mails and other correspondence. Users 148 and 158 may also contribute observed data, or data that is empirically collected without direct inquiries to user 148 and 158. Such observed data may be based on usage patterns for online service 126 including behavioral history, user generated content, and biometric data.

Moving to platform users 162, user 158 and user 163 may directly proffer data to be stored in platform database 118 including user information such as user profile form data and social confirmations such as shared relationships and interactions with other users. User 158 and user 163 may also contribute observed data based on usage patterns for authentication platform 116 including location, timestamps, and behavior history. Online service 126 may store and retrieve user data and certified user data to and from service user database 128 and may also forward data reports to platform database 118 to provide data concerning users within service user database 128.

Moving to global users 160, any user can directly proffer data to various external services. For example, user 161 may proffer data to be stored in external network database 134 associated with an external social networking service. Of course, user 148, user 158, and user 163 may also participate in the same external social networking service. Moreover, while only a single external network database 134 is shown, multiple external data sources may also be provided. The proffered user data may include social confirmations such as shared relationships and interactions with other users. The proffered data in external network database 134 may then be proffered to platform database 118, for example by user agreement to share data with external services. In addition, by corroborating publicly available user data from external network database 134, for example by reading profiles, status updates, posts, messages, and other data, biometric data and behavioral similarities may be observed and stored in platform database 118. Any user may also proffer data to certified identity database 132, which may include publicly accessible data such as public records, financial records, phone numbers, school registrations, and other data. Although certified identity database 132 is shown as a single database for simplicity, it is understood that certified identity database 132 might include several databases administrated by different parties. These administrative parties may have formal procedures to curate their respective databases as accurate to a certain tolerance, thus certifying the data. Certified identity database 132 may then contribute the certified data for storing in platform database 118.

After all the relevant data is consolidated and retrieved from platform database 118, authentication platform 116 may calculate a present trust score for responding to the trust score request from online service 126. Online service 126 may then utilize the trust score to determine whether to grant user 148 with access to online service 126. Similarly, online service 126 may also utilize the trust score to determine whether to grant user 158 with administrative control over parental restrictions and personal data privacy settings for user 148. As changes occur over time in regards to available user data and the staleness of such data within platform database 118, the trust score may be updated periodically or in response to user or application demand to more accurately reflect present conditions.

While FIG. 1 shows a configuration where server 110 and 120 respectively execute authentication platform 116 and online service 126, alternative implementations may consolidate server 110 and 120 into a single server or distribute the workload to multiple servers. Additionally, only a single parent-child relationship between user 148 and 158 is evaluated in FIG. 1 for simplicity. However, alternative implementations may calculate trust scores for relationships between any arbitrary plurality of users and for any type of familial or non-familial relationship including sibling-sibling, employer-employee, friend-friend, student-educator, and spouse-spouse. Furthermore, while user 148 and 158 are shown utilizing a respective client 140 and 150, in alternative implementations user 148 and 158 may utilize a single client, for example when a single computer is shared in a household.

Figure 2:
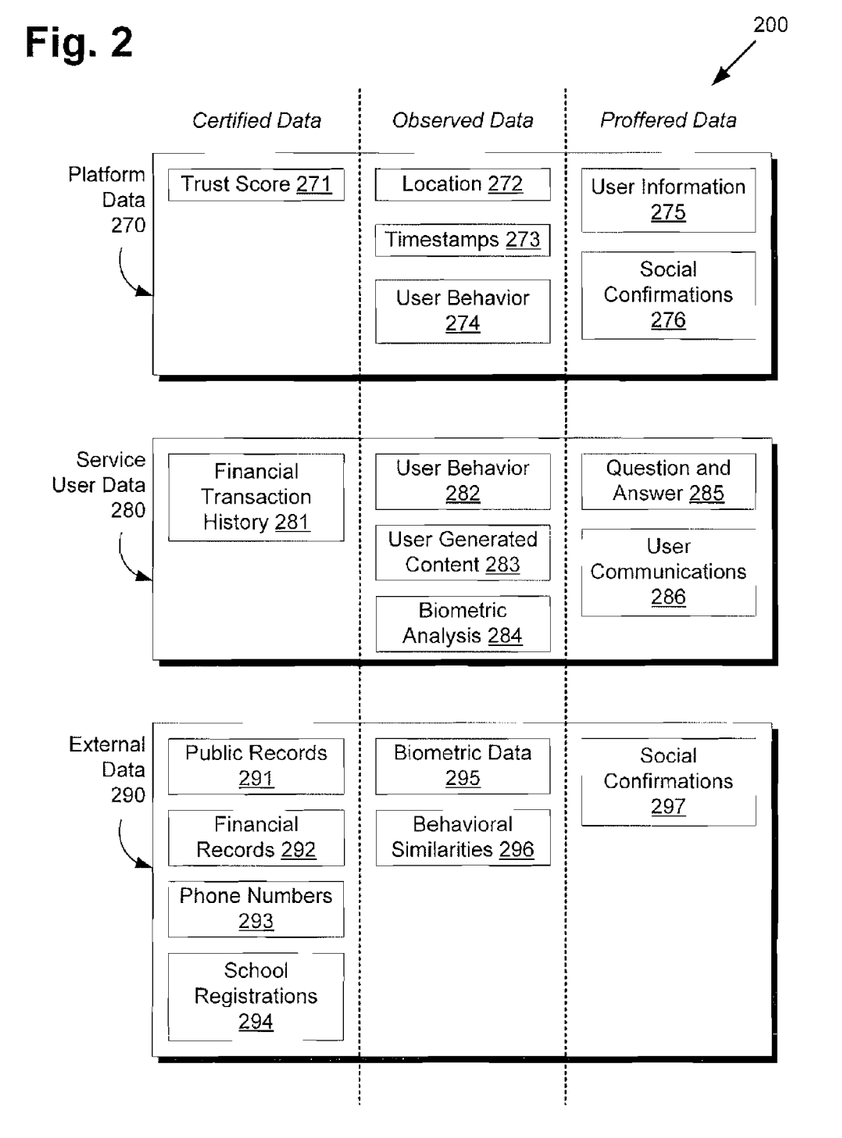
FIG. 2 presents an exemplary data classification for calculating a dynamic trust score for evaluating ongoing online relationships.

Next, FIG. 2 presents an exemplary data classification for calculating a dynamic trust score for evaluating ongoing online relationships. Data classification 200 includes platform data 270, service user data 280, and external data 290. Referring to FIG. 1, platform data 270 may be stored in platform database 118, service user data 280 may be stored in service user data 128, and external data 290 may be stored in certified identity database 132 and external network database 134. Thus, data sets are divided along the y-axis depending on their respective data collection source or database source.

Each data set is further classified along the x-axis into certified data, observed data, and proffered data. The x-axis is sorted in descending order of trustworthiness, with certified data most trustworthy and proffered data least trustworthy. Platform data 270 includes trust score 271 as certified data, location 272, timestamps 273, and user behavior 274 as observed data, and user information 275 and social confirmations 276 as proffered data. Service user data 280 includes financial transaction history 281 as certified data, user behavior 282, user generated content 283, and biometric analysis 284 as observed data, and question and answer 285 and user communications 286 as proffered data. External data 290 includes public records 291, financial records 292, phone numbers 293 and school registrations 294 as certified data, biometric data 295 and behavioral similarities 296 as observed data, and social confirmations 297 as proffered data.

Referring back to FIG. 1, trust score 271 may be calculated by authentication platform 116 for determining the validity of a parent-child relationship between user 158 and user 148. As indicated by the flow of data in FIG. 1, all data may be eventually consolidated into platform database 118 for calculating trust score 270. However, to make data classification 200 more clear, platform data 270 is shown to only include data prior to such a data consolidation. The various data elements shown within data classification 200 may be utilized to dynamically recalculate trust score 271 according to the most recently available data.

Data classification 200 as shown in FIG. 2 is only an exemplary data classification for calculating a dynamic trust score, and other implementations may utilize variables and parameters different than shown for calculating trust score 271. The relative weights of each element within data classification 200 are not specifically shown, but may be adjusted as necessary to reflect the relative trust importance of each element. Moreover, the data variables and parameters shown in data classification 200 may change and extend over time to accommodate new identification technology and/or new database sources.

Starting with certified data of platform data 270, trust score 271 represents a level of confidence in the authenticity and validity of any user-to-user relationship. One or more previous values of trust score 271 may be stored within platform database 118. As time progresses, trust score 271 may be recalculated periodically or on demand. As discussed above, all of the data shown in data classification 200, including previous values of trust score 271, may be utilized when recalculating a present value for trust score 271. Once recalculated, trust score 271 may be certified as valid for the present time.

Next, observed data of platform data 270 includes location 272, timestamps 273, and user behavior 274. Location 272 may include an address or location of user 148 and 158, which may be derived from IP address geo-location, GPS data, Wi-Fi triangulation, or other data. A location 272 that is consistent with an address in user information 275 may also contribute to a higher trust score 271.

Timestamps 273 may include variables concerning recent usage and past history for users 148 and 158 in reference to online service 126 and/or authentication platform 116. For example, as previously discussed, authentication platform 116 may provide a universal login that may authenticate each user for several online services and applications, including online service 126. Thus, assuming that both users 148 and 158 have user accounts with authentication platform 116, timestamps 273 may contain data such as the first date that users 148 and 158 registered with authentication platform 116, and past history with regards to login sessions including start time, location, and session length. For example, a user having a longer membership history with authentication platform 116 may contribute to a higher trust score 271. Similarly, a user having more recent and longer login sessions may contribute a higher trust score 271 compared to a user only having short login sessions further in the past.

User behavior 274 may include past behavioral history and interactions of users 148 and 158 with regards to services utilizing authentication platform 116, including online service 126. Consistent user behavior over time may contribute to a higher trust score 271.

Moving to proffered data of platform data 270, user information 275 may include any proffered data stored in service user database 128 concerning users 148 and 158, including volunteered user profile information and other data. Since much of the data within service user database 128 may be provided directly by users 148 and 158, the data within user information 275 may not significantly contribute to trust score 271 until such data can be certified as accurate. Moreover, each element within user information 275 may also have corresponding timestamps in timestamps 273, which may be used to decrease the weight of certain data due to age or staleness, or to conversely increase the weight of certain data due to newness or freshness.

Turning to service user data 280, certified data of service user data 280 includes financial transaction history 281, which may include a record of any financial transactions between users 148 and 158. For example, a history of completed financial transactions may indicate some level of trust between users 148 and 158. Such financial transactions may include the purchasing of virtual currency, goods or services by user 158 for the benefit of user 148. Of course, financial transactions for tangible goods and services may also be recorded within financial transaction history 281. Financial transaction history 281 may be directly generated by online service 126, for example by pre-paid card redemptions, or otherwise retrieved from external payment processors and networks. Thus, a more established financial transaction history 281 may result in a higher trust score 271.

Continuing, observed data of service user data 280 includes user behavior 282, user generated content 283, and biometric analysis 284. User behavior 282 may include past behavioral history and interactions of users 148 and 158 with regards to services utilizing authentication platform 116, including online service 126. User generated content 283 may include any content submitted by users 148 and 158, for example user uploaded images or photographs, music, video, text including tags, and other user generated or collaborative data. Biometric analysis 284 may include voice and facial recognition of data from user generated content 283. Consistent user behavior and user content over time may contribute to a higher trust score 271.

Next, proffered data of service user data 280 includes question and answer 285 and user communications 286. Question and answer 285 may include direct validation inquiries by telephone, e-mail, or other methods to elicit responses influencing trust score 271. For example, user 158 may be called and a short description may be given of user 148, followed by the question, "Is this your son?" If user 158 responds affirmatively, then trust score 271 may be increased. Similarly, user 148 may also be called regarding user 158, and an affirmative answer may increase trust score 271. Conversely, a negative answer may reduce trust score 271. User communications 286 may include user-to-user communications on any services utilizing online service 126, and may include verbal and non-verbal communications, for example gestures and pokes.

Turning to external data 290, certified data of external data 290 includes public records 291, financial records 292, phone numbers 293 and school registrations 294. Public records 291 may include any records that may be available to the public such as social security records, medical records, tax records, and others. Financial records 292 may include information such as bank accounts, lines of credit, pre-paid accounts, and other data. Shared accounts, joint accounts, or separate accounts at the same financial institution may increase trust score 271. Phone numbers 293 may include one or more phone numbers of users 148 and 158, wherein common area codes, suffixes, or shared phone numbers may increase trust score 271 when determining a parent-child relationship. School registrations 294 may include information regarding the school enrollment and history of user 148 and other users in global users 160.

Next, observed data of external data 290 includes biometric data 295 and behavioral similarities 296. Biometric data 295 may include any images and audio previously attributable to users 148 and 158. The images and audio may, for example, be captured from hotels, stores, theme parks, or other locations associated with the operator of online service 126. For example, users 148 and 158 may have previously booked a family vacation at an associated hotel and theme park. Video footage may be captured at the hotel and theme park and saved as biometric data 295. If client 140 and 150 include video capture devices such as web cameras, images and audio of user 148 and 158 may be captured and compared to biometric data 295. A closer biometric match may thus result in a higher trust score 271.

Behavioral similarities 296 may analyze external third-party networks for similar behavioral patterns tending to verify the parent-child relationship of users 148 and 158. Thus, for example, if user 148 is primarily friends with younger peers and user 158 is primarily friends with older peers on third-party social networking sites, then trust score 271 may be increased as the peer ages of users 148 and 158 may be consistent with a parent-child age difference. Social grouping patterns for users 148 and 158 that are similar between service user database 128 and external network database 134 may also contribute to an increased trust score 271. For example, in both service user database 128 and external network database 134, the friends of user 148 may be interested in video games whereas the friends of user 158 may be interested in cooking, demonstrating a similar pattern of friends with shared interests inside and outside of online service 126.

Continuing, proffered data of external data 290 includes social confirmations 297, which may include corroborating data from outside social networks, gaming networks, education networks, and other external networks, such as within external network database 134. For example, friends from outside social networks may confirm that users 148 and 158 are indeed child and parent. Thus, friends of users 148 and 158 who are not necessarily registered with authentication platform 116 or online service 126 may still vouch for the genuineness of the parent-child relationship between users 148 and 158.

As discussed above, the parent-child relationship between user 148 and 158 is only one type of relationship to be established and verified. Other relationships may be evaluated as well. For example, a user-user relationship may be evaluated for the purpose of favoring interactions with local users, such as other users attending the same school as user 148. Thus, user 158 may set an account preference where user 148 is preferred to interact with other users of the same school. In this case, school registrations 294 may contribute a larger amount towards trust score 271.

User 158 may also restrict the account of user 148 by only permitting interactions with users meeting specific graduated trustworthiness levels. For example, a trust score minimum in a green range may only allow interactions with users from the same school and with a high trust score with a respective parent relationship. A trust score minimum in a yellow range may only allow interactions with users from the same school but may permit a less rigorous trust score with the respective parent relationship. A trust score minimum in a red range may allow unfettered interactions with any other user. Thus, an easy to understand sliding scale or color coded scale may be utilized to enable user 158 to specify a comfortable privacy level for user 148.

Figure 3:
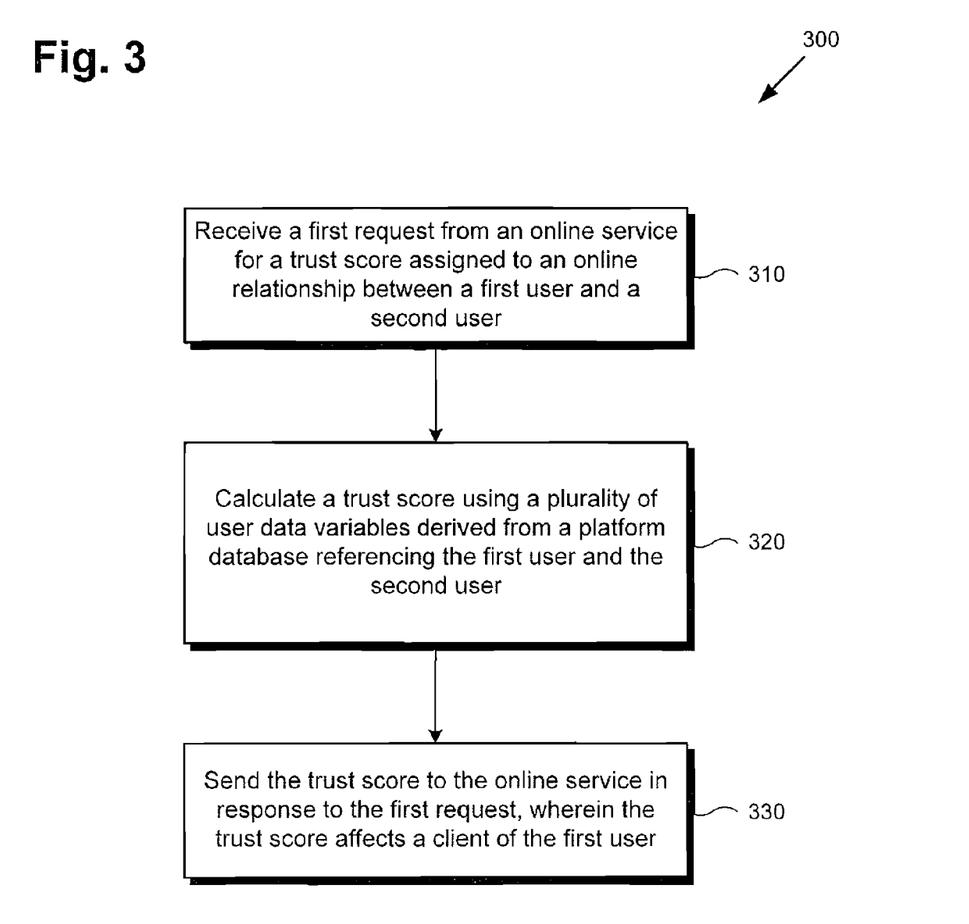
FIG. 3 presents an exemplary flowchart illustrating a method by which a dynamic trust score for evaluating ongoing online relationships may be provided.

FIG. 3 presents an exemplary flowchart illustrating a method by which a dynamic trust score for evaluating ongoing online relationships may be provided. Flowchart 300 begins when processor 112 of server 110 executing authentication platform 116 receives a first request from online service 126 for a trust score 271 assigned to an online relationship between user 148 and user 158 (310). As previously discussed, this relationship may be defined as a parent-child relationship, but may also be defined as any other type of relationship.

Next, processor 112 calculates a trust score 271 using user data variables derived from platform database 118 referencing user 148 and user 158 (320). As previously discussed, various internal and/or external data sources may be consolidated in platform database 118 for calculating trust score 271, with a detailed example given as data classification 200 in FIG. 2. Additionally, due to the passage of time and the changing importance of certain data values, the individual weighing of user data variables or elements within data classification 200 may also vary over time.

Continuing, processor 112 sends trust score 271 to online service 126 in response to the first request of 310, wherein trust score 271 affects client 140 of user 148 (330). As previously discussed, this effect on client 140 may manifest in different user account limitations. One effect is to alter the set of interactions available to user 148 with other users in online service 126. As previously discussed, a graduated trust scale may be presented to user 158, allowing the selection of a comfortable minimum trust level. Thus, another effect is to grant user 158 administrative control of user 148 in online service 126, for example to restrict the scope of user interactions and the disclosure of private personal data. These effects may be indicated on display 141, for example by hiding users that user 148 is not authorized to interact with, or by denying access to certain portions of online service 126, or by preventing user 148 from disclosing certain personal details to other users, for example by darkening and disabling certain communication icons. However, the effects on client 140 are not always necessarily restrictive and may also be expansive as well.

Since trust score 260 may dynamically adjust over time as the elements within data classification 200 change over time, processor 112 may also receive a second request from online service 126, recalculate trust score 271, and send the updated trust score 271 to online service 126, using a procedure similar to 310, 320, and 330 of flowchart 300. The recalculation of trust score 271 may also weigh in previous values of trust score 271 as part of the recalculation. As previously discussed, the second request and further requests may be triggered on a periodic basis, or may be triggered on demand from a user or an application.

Accordingly, a dynamic trust score for evaluating ongoing online relationships has been disclosed. By considering a plurality of user data variables and using validation data from internal and external database sources, a trust score with a high degree of confidence may be provided for establishing and verifying online relationships. Moreover, since the trust score may be dynamically recalculated periodically or on demand, the trust score may also validate over continuing periods of time, as opposed to conventional verification systems that only validate at a single point in time. Thus, a higher degree of safety, reliability, and control is provided for online services directed towards children or other user classes that may require greater protection as a result of legal, cultural, and moral imperatives.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A server providing an authentication platform for determining dynamic trust scores evaluating ongoing online relationships, the server comprising:
a hardware processor configured to execute the authentication platform stored in a memory to:
receive a first request from an online service for a trust score assigned to an online relationship between a first user and a second user;
calculate the trust score using a plurality of user data variables derived from a platform database referencing the first user and the second user, the user data variables including certified data and proffered data, wherein a weight given to each of the plurality of user data variables corresponds to a trust importance of each of the plurality of user data variables, and wherein the weight is adjusted over time for calculation of future trust scores based on a charge in the trust importance of each of the plurality of user data variables;
save the trust score as a previous trust score in the memory;
send the trust score to the online service in response to the first request, wherein the trust score affects a client of the first user; and
performing dynamic recalculation of the trust score in response to a change to the plurality of data variables over a period of time, wherein the change includes varying the weight given to each of the plurality of user data variables over a period of time, wherein the dynamic recalculation includes using the previous trust score.

2. The server of claim 1, wherein the platform database includes data from an internal database and an external database.

3. The server of claim 1, wherein the processor is further configured to:
receive a second request from the online service for the trust score;
recalculate the trust score in response to a change to the plurality of user data variables over a period of time;
send the trust score to the online service in response to the second request.

4. The server of claim 1, wherein the affecting of the client is indicated on a display of the client.

5. The server of claim 1, wherein the affecting of the client comprises a restriction on interactions of the first user with other users in the online service.

6. The server of claim 1, wherein the affecting of the client comprises granting the second user administrative control of the first user in the online service.

7. The server of claim 1, wherein the certified data regarding the first user and the second user includes at least one of a previous trust score, a financial transaction history, a public record, a financial record, a phone number, and a school registration.

8. The server of claim 1, wherein the user data variables further include observed data regarding the first user and the second user including at least one of a location, a timestamp, a user behavior, a user generated content, a biometric analysis, and a biometric data.

9. The server of claim 1, wherein the proffered data regarding the first user and the second user includes at least one of a user information, a social confirmation, a question and answer, and a user communication.

10. A method for providing a dynamic trust score for evaluating ongoing online relationships, the method comprising:
receiving a first request from an online service for a trust score assigned to an online relationship between a first user and a second user;
calculating the trust score using a plurality of user data variables derived from a platform database referencing the first user and the second user, the user data variables including certified data and proffered data, wherein a weight given to each of the plurality of user data variables corresponds to a trust importance of each of the plurality of user data variables, and wherein the weight is adjusted over time for calculation of future trust scores based on a change in the trust importance of each of the plurality of user data variables;
saving the trust score as a previous trust score in a memory;
sending the trust score to the online service in response to the first request, wherein the trust score affects a client of the first user, and
performing dynamic recalculation of the trust score in response to a change to the plurality of user data variables over a period of time, wherein the change includes varying the weight given to each of the plurality of user data variables over the period of time, wherein the dynamic recalculation includes using the previous trust score.

11. The method of claim 10, further comprising:
receiving a second request from the online service for the trust score;
recalculating the trust score in response to a change to the plurality of user data variables over a period of time;
sending the trust score to the online service in response to the second request.

12. The method of claim 10, wherein the affecting of the client is indicated on a display of the client.

13. The method of claim 10, wherein the affecting of the client comprises granting the second user administrative control of the first user in the online service.

14. The method of claim 10, wherein the certified data regarding the first user and the second user includes at least one of a previous trust score, a financial transaction history, a public record, a financial record, a phone number, and a school registration.

15. The method of claim 10, wherein the user data variables further include observed data regarding the first user and the second user including at least one of a location, a timestamp, a user behavior, a user generated content, a biometric analysis, and a biometric data.

16. The method of claim 10, wherein the proffered data regarding the first user and the second user includes at least one of a user information, a social confirmation, a question and answer, and a user communication.

17. A system providing dynamic trust scores for evaluating ongoing online relationships, the system comprising:
a client of a first user;
a first server including a first processor configured to execute an online service;
a second server including a second processor configured to:
receive a first request from the online service for a trust score assigned to an online relationship between the first user and a second user;
calculate the trust score using a plurality of user data variables derived from a platform database referencing the first user and the second user, the user data variables including certified data and proffered data, wherein a weight given to each of the plurality of user data variables corresponds to a trust importance of each of the plurality of user data variables, and wherein the weight is adjusted over time for calculation of future trust scores based on a change in the trust importance of each of the plurality of user data variables;
save the trust scores as a previous trust score in a memory;
send the trust score to the online service in response to the first request, wherein the trust score affects the client of the first user; and
perform dynamic recalculation of the trust score in response to a change to the plurality of user data variables over a period of time, wherein the change includes varying the weight given to each of the plurality of user data variables over the period of time, wherein the dynamic recalculation includes using the previous trust score.

18. The system of claim 17, wherein the second processor is further configured to:
receive a second request from the online service for the trust score;
recalculate the trust score in response to a change to the plurality of user data variables over a period of time;
send the trust score to the online service in response to the second request.

19. The server of claim 1, wherein the online service utilizes the trust score to determine whether to grant the first user administrative control over parental restrictions and personal data privacy settings for the client of the first user.

20. The method of claim 10, wherein the online service utilizes the trust score to determine whether to grant the first user administrative control over parental restrictions and personal data privacy settings for the client of the first user.

* * * * *